United States Patent [19]

Beck et al.

[11] 4,277,579
[45] Jul. 7, 1981

[54] INCREASING THE MOLECULAR WEIGHT OF A CHLORINATED POLYMER OF ETHYLENE BY TREATMENT WITH A SULFUR COMPOUND EITHER BEFORE OR DURING CHLORINATION OF SAID POLYMER

[75] Inventors: Manfred Beck, Odenthal-Hahnenberg; Wilhelm Göbel, Leverkusen, both of Fed. Rep. of Germany

[73] Assignee: Bayer Aktiengesellschaft, Fed. Rep. of Germany

[21] Appl. No.: 55,383

[22] Filed: Jul. 9, 1979

[30] Foreign Application Priority Data

Jul. 12, 1978 [DE] Fed. Rep. of Germany ....... 2830556

[51] Int. Cl.$^3$ ................................................. C08F 8/20
[52] U.S. Cl. ...................................... 525/344; 525/281; 525/330; 525/345; 525/354; 525/356
[58] Field of Search ............... 525/344, 354, 356, 357, 525/358, 359

[56] References Cited

U.S. PATENT DOCUMENTS

| | | | |
|---|---|---|---|
| 2,586,363 | 2/1952 | McAlevy | 525/356 X |
| 3,035,029 | 5/1962 | Powers | 525/330 X |
| 3,244,774 | 4/1966 | Kaupp | 260/783 |
| 3,541,032 | 11/1970 | Pampus | 525/355 |
| 3,704,286 | 11/1972 | Schafer | 525/356 X |
| 3,936,430 | 2/1976 | Schoen | 525/356 X |

FOREIGN PATENT DOCUMENTS 1522223  3/1968  France ...................................... 260/777

Primary Examiner—C. A. Henderson
Attorney, Agent, or Firm—Connolly and Hutz

[57] ABSTRACT

The molecular weight of chlorine containing elastomers are increased by adding sulphur compounds before or during the chlorination of elastomers.

5 Claims, No Drawings

INCREASING THE MOLECULAR WEIGHT OF A CHLORINATED POLYMER OF ETHYLENE BY TREATMENT WITH A SULFUR COMPOUND EITHER BEFORE OR DURING CHLORINATION OF SAID POLYMER

BACKGROUND OF THE INVENTION

The present invention relates to a process for increasing the molecular weight of chlorine-containing elastomers by the addition of sulphur compounds before or during the chlorination reaction and to elastomers produced thereby.

Because of solubility problems, the chlorination of polyolefins in solution necessitates the use of polyolefins of relatively low molecular weight. Accordingly, the products obtained frequently have viscosities (measured as the Mooney viscosity) which are too low for technical applications, and the crosslinking with peroxides of, for example, chlorinated polyethylenes such as these gives vulcanisates having unsatisfactory physical properties.

Consequently, there is a need in the art for chlorinated elastomers which have sufficiently high Mooney viscosities and the vulcanisates of which show satisfactory physical properties.

SUMMARY OF THE INVENTION

It has now been found that the above disadvantages can be obviated by the addition of a sulphur compound before or during chlorination of the corresponding elastomers.

Examples of sulphur compounds suitable for this purpose are disulphur dichloride, disulphur dibromide, sulphur dichloride, sulphur dibromide, thionyl chloride, thionyl bromide and mixtures thereof.

It is also possible to add substances which are capable of forming the above mentioned compounds during chlorination by reaction with the chlorine present. Substances such as these are, for example, sulphur and hydrogen sulphide.

PREFERRED EMBODIMENTS

The increase in the molecular weight of the chlorine-containing elastomers can be controlled by means of the time at which, and also by means of the quantity in which the sulphur compounds are added. For a given quantity of sulphur compound, the effect obtained is greater the earlier the addition is made. The upper quantitative limit is reached when crosslinked polymers are formed. In general, this limit lies at 5 parts by weight of sulphur compounds per 100 parts by weight of polymer. Quantities below 0.01 part by weight are in most cases ineffective.

Chlorination of the elastomers is normally carried out in solution. It may also however, be carried out in suspension, or in a fluidised bed without using a solvent or suspending agent. In the latter case, the sulphur compound is either added to the elastomer before-hand or else is introduced with the stream of chlorine.

Suitable solvents or suspending agents are, for example, halogenated hydrocarbons, such as carbon tetrachloride, chloroform, methylene chloride, tetrachloroethane and/or chlorobenzene.

Chlorine or chlorine donors may be used as the chlorinating agents, but it is preferred to use chlorine.

The quantity of chlorinating agent used is determined by the required degree of chlorination. The quantity is generally between 1 and 300 parts by weight and preferably between 30 and 150 parts by weight per 100 parts by weight of the elastomer to be chlorinated.

The temperature at which the chlorination reaction is carried out in the presence of the sulphur compound may be varied within wide limits, and is generally governed by the chlorination conditions. It may vary between $-50°$ C. and $+180°$ C. according to the process adopted. The chlorination reaction is preferably carried out, however, at a temperature in the range of from $50°$ C. to $140°$ C.

The process may be applied both to ethylene homopolymers of high and low density and also to copolymers of ethylene and vinyl acetate. Copolymers such as these may have a vinyl acetate content of up to 80% by weight. Products containing up to 50% by weight of vinyl acetate are, however, preferred, and products containing up to 20% by weight of vinyl acetate are particularly preferred. Copolymers of olefins, for example ethylene/propylene or ethylene/butene copolymers, are also employable in the reaction. Terpolymers of ethylene/propylene and an unconjugated diene (EPDM rubber) may also be used. If, in addition to chlorine, another reactive component, for example sulphur dioxide or sulphuryl chloride, is added during chlorination, for example to obtain chlorosulphonated chlorinated polyethylenes, an increase in the molecular weight of the polymers may be obtained in this case, too, by the addition of suitable sulphur compounds.

The chlorinated polymer may be isolated by known methods, for example by precipitation with methanol, by introducing steam into the solution, or by simultaneously introducing the polymer solution and steam into hot water.

Drying may be carried out by any of the methods normally used in rubber technology.

After crosslinking, for example with peroxides, the polymers produced in accordance with the present invention may be used for the production of high-quality technical rubber goods, for example cable sheaths and hoses.

The process according to the present invention is illustrated by the following Examples.

EXAMPLE 1

360 g of ethylene copolymer having a vinyl acetate content of 3.5% (MI (DIN 53 735) 0.4, d=0.963, $(\eta)=0.95$ (dichlorobenzene $127°$ C.)) is dissolved in 4800 g of boiling carbon tetrachloride. 64 g/h of chlorine are then introduced. A total of 640 g of chlorine is introduced over a period of 10 hours. After 9 hours, a solution of 3.6 g of disulphur dichloride in 50 ml of carbon tetrachloride is added dropwise over a period of 15 minutes without interrupting chlorination, and the reaction is then completed. Following the addition of 3.3 g of basic lead phthalate, the chlorinated polyethylene is isolated by precipitation with ethanol and is then dried in vacuo at $60°$ C. The chlorine content amounted to 35.1%.

EXAMPLE 2

A chlorinated polyethylene is produced in the same manner as in Example 1, except that the indicated quantity of $S_2Cl_2$ is added after only 5 hours of chlorination. The product obtained contains 34.2% of chlorine.

COMPARISON EXAMPLE 1

The ethylene polymer is chlorinated in the same way as in Example 1, except that no $S_2Cl_2$ is added. Chlorine content: 34.5%.

TESTING IN RUBBER

The chlorinated ethylene copolymers produced in Examples 1 and 2 and Comparison Example 1 were mixed in accordance with the following recipe, and were then vulcanised for 20 minutes at 170° C.:

| Test Mixture | |
|---|---|
| Chlorinated PE copolymer | 100 parts by weight |
| Basic lead phthalate | 5 parts by weight |
| Epoxidised soya oil | 10 parts by weight |
| Trimethyl dihydroquinoline | 0.1 part by weight |
| Carbon black | 50 parts by weight |
| Bis-(tert.-butyl-peroxi-diisopropyl)-benzene | 5 parts by weight |
| Triallyl cyanurate | 1 part by weight |

The test results are set out in the following Table:

| | Example 1 | Example 2 | Comparison Example 1 |
|---|---|---|---|
| Crude rubber | | | |
| Solubility in dichlorobenzene | partial | insoluble | soluble |
| ML-4 (100° C.) (ME) | 100 | 175 | 62 |
| Defo hardness (DH) | 2300 | 4750 | 2050 |
| Defo elasticity (DE) | 50 | 56 | 38 |
| Vulcanisate | | | |
| Tensile strength | 15.2 | 15.8 | 14.0 |
| Elongation (%) | 310 | 280 | 345 |
| Modulus at 100/300% | 2.6/12.2 | 3.5/— | 3.1/12.5 |
| Hardness (Shore A) | | | |
| 20/70° C. | 64/52 | 65/58 | 68/51 |
| Δ H (Shore A units) | 12 | 7 | 17 |

In addition to improved tensile strength, the improved difference in hardness (ΔH) at 20° C. and 70° C. is particularly noticeable. In the case of Comparison Example 1, it amounts to 17 Shore A units whereas, in Examples 1 and 2, it decreases to 12 and 7 units, respectively.

COMPARISON EXAMPLE 2

This Example demonstrates the ineffectiveness of $S_2Cl_2$ on chlorinated polyethylenes when the addition is made after chlorination. To this end, quantities of 200 g of chlorinated polyethylenes are dissolved in 1800 g of carbon tetrachloride, 2 g of $S_2Cl_2$ is added and then the mixture is heated under reflux for 2 hours. The results obtained are set out in Table 1. It can be seen that the Mooney viscosities of the treated products are distinctly lower than those of the starting products.

TABLE 1

| | | ML-4 (100° C.) | |
|---|---|---|---|
| Polyethylene | Chlorine content | before treatment with $S_2Cl_2$ | after treatment with $S_2Cl_2$ |
| Ethylene homopolymer d = 0.919 | 38.5% | 41 | 16 |
| Ethylene/vinyl acetate copolymer containing 3.5% of VA | 35.2% | 73 | 32 |

EXAMPLES 3 to 5

720 g of granulated ethylene/vinyl acetate copolymer (d=0.926, MI=0.25, VA content=3.5%) is dissolved in 6 liters of boiling carbon tetrachloride. 920 g of chlorine is then introduced over a period of 8 hours, a solution of 4.04 g of benzoyl peroxide in 100 ml of $CCl_4$ being added dropwise over the same period. After chlorination for 5 hours, 4.3 liters (7.2 g) of disolphur dichloride (1 phr) dissolved in 20 ml of $CCl_4$ are added, and the chlorination reaction is then completed. The chlorine content amounts to 35.3% (Example 3).

Chlorination is carried out in the same way as in Example 3, except that the $S_2Cl_2$ is added in a quantity of only 3.6 g (0.5 phr) as opposed to 7.2 g. Chlorine content: 35.4% (Example 4).

In Example 5, chlorination is carried out in the absence of $S_2Cl_2$.

The following table shows the influence of $S_2Cl_2$ addition on the solubility and viscosity of the polymer.

| Example No. | Solubility in dichlorobenzene | ML-4 (100° C.) (ME) |
|---|---|---|
| 3 | insoluble | 200 |
| 4 | only partly soluble | 158 |
| 5* | soluble | 90 |

| Defo hardness (DH) | Defo elasticity (DE) |
|---|---|
| 6000 | 60 |
| 4450 | 58 |
| 2250 | 44 |

*(Comparison)

EXAMPLES 6 and 7

These examples demonstrate the effectiveness of $S_2Cl_2$ in the chlorination of a homopolyethylene. A homopolymer (d=0.919, MI (DIN 53 735)=7.0) was chlorinated in the same manner as in Example 3 and, after 5 hours, $S_2Cl_2$ (0.5 phr) was added (example 6). For comparison (Example 7), the same polyethylene is chlorinated in the absence of disulphur chloride.

| Example No. | % Cl | $S_2Cl_2$ phr | ML-4' (100°) | Defo hardness | Defo elasticity |
|---|---|---|---|---|---|
| 6 | 35.3 | 0.5 | 110 | 2300 | 53 |
| 7* | 36.2 | 0 | 40 | 600 | 21 |

*(comparison)

EXAMPLE 8

360 g of ethylene/vinylacetate copolymer (vinylacetate content 28%, MI (ASTMD-1238 modif. 6 g/10 mins) is dissolved with heating in 4800 g of carbon tetrachloride. 400 g of chlorine were introduced into the boiling solution over a period of 6 hours. After 5 hours chlorination, a sample was taken and added to a solution of 4 g of $S_2Cl_2$ in 20 ml of $CCl_4$, after which chlorination was completed. When the $S_2Cl_2$ was added, the chlorine content amounted to 19.2% and the L-value of the product (viscosity η spec/c for c=5 g/l in dichlorobenzene, 100° C.) amounted to 0.96. On completion of the reaction, the isolated product contained 24.6% of Cl and had an L-value of 1.17. A sample produced in the same way, but without the addition of $S_2Cl_2$, also contained 24.2% of Cl and had an L-value of 0.89.

EXAMPLE 9

180 g of polyethylene was dissolved in 2400 g of carbon tetrachloride. 160 g of chlorine was then introduced over a period of 6 hours. After 90% of the chlorine had been introduced, 16 g of hydrogen sulphide were additionally introduced. The chlorine content amounted to 32.0%. The product showed rubber-like elasticity, but was no longer soluble in dichlorobenzene. Polyethylene chlorinated in the absence of $H_2S$ was completely soluble in dichlorobenzene.

We claim:

1. A process for increasing the molecular weight of a chlorinated elastomer obtained by the chlorination of a polymeric hydrocarbon with a chlorinating agent, said polymeric hydrocarbon being selected from the group consisting of low and high density homopolymers of ethylene, copolymers of ethylene and vinyl acetate having a vinyl acetate content of up to 80% by weight, copolymers of ethylene and propylene, copolymers of ethylene and butene and terpolymers of ethylene, propylene and an unconjugated diene and said process comprising adding at least one compound selected from the group consisting of disulphur dichloride, disulphur dibromide, sulphur dichloride, sulphur dibromide, thionyl chloride and thionyl bromide to said elastomer, either before or during chlorination, in a quantity of from 0.01 to 5 parts by weight per 100 parts by weight of elastomer.

2. The process of claim 1 wherein the chlorination is carried out at a temperature of from $-50°$ to $180°$ C.

3. The process of claim 1 wherein the chlorination is carried out at a temperature of from $50°$ to $140°$ C.

4. The process of claim 1 wherein the chlorinating agent is used in a quantity of from 1 to 300 parts by weight per 100 parts by weight of elastomer to be chlorinated.

5. The process of claim 1 wherein the chlorinating agent is used in a quantity of from 30 to 150 parts by weight per 100 parts by weight of elastomer to by chlorinated.

* * * * *